United States Patent [19]

Yamazaki

[11] Patent Number: 5,174,035
[45] Date of Patent: Dec. 29, 1992

[54] ATTITUDE SENSING APPARATUS

[76] Inventor: Shigemi Yamazaki, 7-16, Higashiyaguchi 2-Chome, Ota-ku, Tokyo, Japan

[21] Appl. No.: 732,617

[22] Filed: Jul. 19, 1991

Related U.S. Application Data

[63] Continuation of Ser. No. 522,675, May 11, 1990, abandoned.

[30] Foreign Application Priority Data

May 18, 1989 [JP] Japan ................. 63-122898

[51] Int. Cl.$^5$ .............................................. G01C 9/16
[52] U.S. Cl. ........................................ 33/395; 33/402; 33/341; 33/345
[58] Field of Search ............. 33/395, 402, 391, 340, 33/341, 345, 1 N

[56] References Cited

U.S. PATENT DOCUMENTS

| | | | |
|---|---|---|---|
| 2,577,875 | 12/1951 | Cloud | 33/345 |
| 2,627,666 | 2/1953 | Levrero | 33/395 |
| 2,933,821 | 4/1960 | D'Enis | 33/345 |
| 3,591,925 | 7/1971 | Dupin | 33/391 |
| 3,975,831 | 8/1976 | Jysky et al. | 33/395 |
| 4,090,306 | 5/1978 | Darden | 33/391 |
| 4,606,133 | 8/1986 | Mills | 33/391 |
| 4,700,479 | 10/1987 | Saito et al. | 33/402 |

FOREIGN PATENT DOCUMENTS

| | | | |
|---|---|---|---|
| 2914321 | 10/1979 | Fed. Rep. of Germany | 33/391 |
| 0170713 | 9/1985 | Japan | 33/391 |
| 62-280608 | 12/1987 | Japan | |

Primary Examiner—William A. Cuchlinski, Jr.
Assistant Examiner—Alvin Wirthlin
Attorney, Agent, or Firm—Irving M. Weiner; Joseph P. Carrier; Robert M. Petrik

[57] ABSTRACT

An attitude sensing apparatus for detecting a tilt angle and an azimuth angle of the tilt of a structure includes a pair of detecting devices disposed on the structure at right angles to each other. Each of the detecting devices consists of a rotary shaft rotatably supported from a structure to be measured, a sensor support integrally held by the rotary shaft and biased in the vertical direction by gravity, a tilt angle sensor supported by the sensor support for detecting a tilt angle of the sensor support within a plane containing the axis of the rotary shaft, and a controller for controlling rotation of the rotary shaft with respect to the structure. The apparatus also includes a calculator which calculates a maximum tilt angle and an azimuth angle thereof of the structure on the basis of tilt angles detected by the two tilt angle sensors. This calculation is simply and rapidly effected according to approximating formulae, and yet at a good precision.

8 Claims, 7 Drawing Sheets

ATTITUDE SENSING APPARATUS

This application is a continuation of U.S. patent application Ser. No. 07/522,675 filed May 11, 1990, now abandoned.

BACKGROUND OF THE INVENTION

1. Field of the Invention

The present invention relates to an omnidirectional azimuth and tilt angle meter which can detect a tilt angle and a tilt azimuth angle of a structure or a moving body.

2. Description of the Relevant Art

Though there is a demand for continuously detecting an omnidirectional tilt angle in an industrial robot, a ship, a special vehicle, civil engineering and construction works or the like, in this case often the detected value cannot be utilized for automatic control and the like unless a maximum tilt angle and azimuth angle thereof are detected on a real-time basis.

As a tilt angle measuring apparatus, an apparatus displaying a tilt angle about only one axis has been heretofore known. However, if it is intended to seek for a maximum tilt angle and an azimuth angle thereof over the entire direction, the apparatus is placed horizontally at a measuring point and rotated over 360 degrees about the measuring point by manual operations, then it is set in the direction indicating a maximum angle of elevation or depression, thereafter a tilt angle indicated at that time is read out, and both the set azimuth angle and the read tilt angle are jointly utilized as measured data.

While such works relying upon manual operations can be adapted for a wide range of azimuth angles, it necessitates much measuring time, and it is difficult to obtain precise omnidirectional tilt data at a given time point.

Moreover, it is impossible to use the data for automatic control which is especially demanded in recent years and which necessitates to process on a real-time basis, and so the use of such apparatus is extremely limited.

Therefore, one example of relevant art in which two tilt angle measuring apparatus each measuring a tilt angle about only one axis are prepared and disposed at right angles to each other, and a maximum tilt angle and an azimuth angle are calculated from the measured data of the both measuring apparatus (Laid-Open Japanese Patent Specification No. 62-280608 (1987)), has been already proposed by the same inventor as the inventor of the present invention.

In this example of relevant art, two tilt angle sensors for detecting a tilt angle about one axis directed in a given direction are swingably disposed on a structure to be measured with their axes directed at right angles to each other, and the tilt angle sensors have their measuring movable planes always directed vertically.

And a maximum tilt angle and a tilt azimuth angle are calculated from the tilt angles detected by the respective tilt angle sensors.

However, due to the fact that the tilt angle sensor is disposed so as to be freely swingable with respect to a structure, in the case where it swings, it necessitates some time period until the sensor becomes stabilized, and so, for a structure whose attitude changes in a short period of time, a response speed of the sensor becomes an issue.

Also, in view of the amplitude of swinging of the tilt angle sensor, it is necessary to secure a large swinging space, and this becomes a bar against reduction in size.

Furthermore, in order to obtain a maximum tilt angle and its azimuth angle on the basis of detection signals issued from the two tilt angle sensors, complicated calculation is necessitated, hence digital calculation by means of a computer becomes essentially necessary, and it resulted in a high cost.

SUMMARY OF THE INVENTION

The present invention has been worked out in view of the above-mentioned circumstances of the relevant art, and it is one object of the present invention to provide a small-sized attitude sensing apparatus having an excellent response speed.

According to one feature of the present invention, there is provided an attitude sensing apparatus comprising two detecting devices disposed on a structure to be measured at right angles to each other, each detecting device including a rotary shaft rotatably supported from the structure, a sensor support integrally held by the shaft and biased vertically by gravity, a tilt angle sensor supported by the sensor support for detecting a tilt angle of the sensor support within a plane containing the axis of the rotary shaft, a control means for controlling rotation of the rotary shaft respect to the structure; and calculator means for calculating the attitude of the structure on the basis of detected values fed from the tilt angle sensors of both of the detecting devices.

Owing to the fact that the sensor support is controlled by the control means, a stabilizing speed of the tilt angle sensor supported by the sensor support and a response speed are extremely fast in comparison to known omnidirectional tilt angle devices.

In addition, a swinging angle of the sensor support is small, and hence reduction in size of the entire apparatus can be achieved to the corresponding extent.

Furthermore, it is possible to calculate a precise maximum tilt angle $\theta$ and its azimuth angle $\psi$ by making use of predetermined approximating calculations, hence a response speed is further improved by means of a simple calculator circuit, and a low cost can be realized.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

In the following, description will be made on one preferred embodiment of the present invention illustrated in FIGS. 1 to 8.

Figure 1:
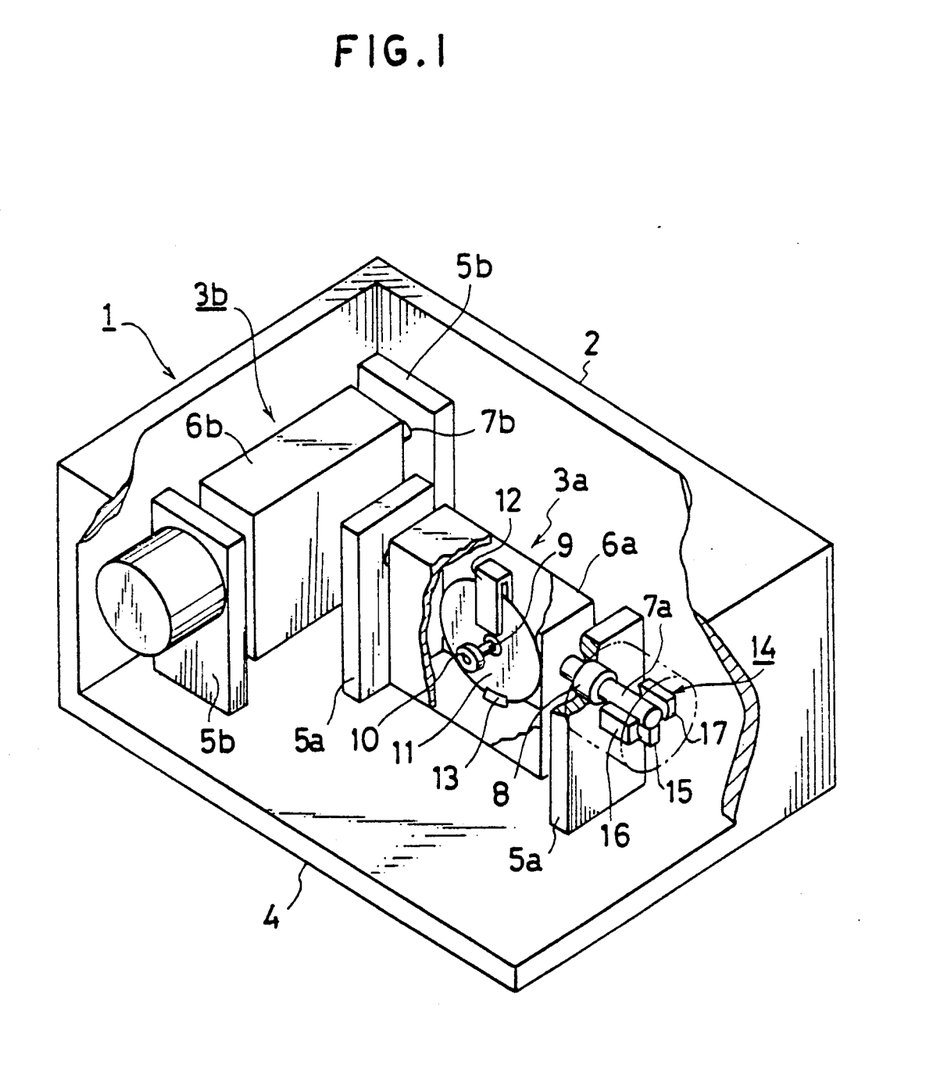
FIG. 1 is a perspective view partly cut away of an attitude sensing apparatus according to one preferred embodiment of the present invention.

FIG. 1 is a general perspective view partly cut away of an attitude sensing apparatus 1 according to the first preferred embodiment.

Within a casing 2 having a rectangular box shape are disposed two detecting devices 3a and 3b at right angles to each other.

Two pairs of opposed support plates 5a, 5a and 5b, 5b are erected on a bottom plate 4 of the casing 2, and the detecting devices 3a and 3b are respectively associated with the respective pairs of support plates 5a, 5b and 5b, 5b. Since these detecting devices 3a and 3b have an identical structure, in the following, description will be made on the structure of one detecting device 3a.

Between the opposed support plates 5a is positioned a sensor support 6a having a rectangular box shape, and coaxial rotary shafts 7a projected sidewise outwardly from front and rear side walls of the sensor support 6a are rotatably supported by bearings 8, 8 provided in the support plates 5a, 5a.

The rotary shafts 7a are parallel to the bottom plate 4 and extend in a direction at right angles to rotary shafts 7b of the other detecting device 3b.

Since the sensor support 6a is rotatably suspended with its center of gravity located lower than the axis of the rotary shafts 7a, the gravity acts upon the sensor support 6a in such manner that its left and right side surfaces may be always directed in the vertical direction.

Within the sensor support 6a is rotatably mounted a rotary shaft 9 directed in the direction at right angles of the aforementioned rotary shafts 7a, between the left and right side walls via bearings 10, and a disc 11 is integrally and fixedly secured to the rotary shaft 9.

This disc 11 is an optical slitted disc for use in an absolute type encoder, and a rotary angle of the disc 11 can be detected as a digital value by means of an optical reader 12a projected downwards from the top wall of the sensor support 6a along the radial direction of the disc 11.

Figure 5:
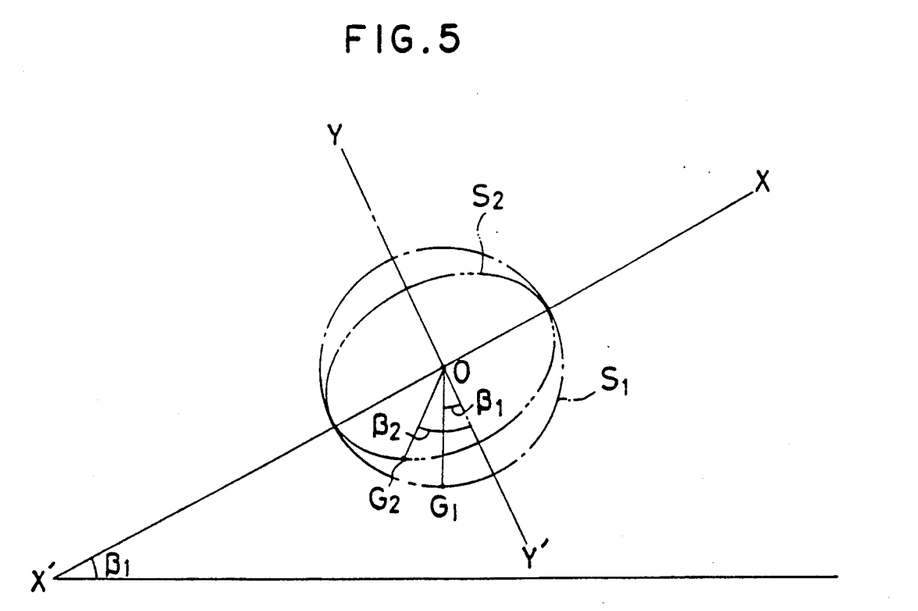
FIG. 5 is a diagram for explaining an operating principle.

At a predetermined position on the outer circumference of the disc 11 is fixedly secured a weight 13, and since this weight 13 tends to be positioned always right under the axis of the rotary shaft 9, normally the rotary angle of the disc 11 read out by the optical reader 12a is equal to a tilt angle α (or similarly tilt angle β if the other optical reader 12b is being considered) formed between the axis of the rotary shafts 7a (such as line X—$X_1$ in FIG. 5 which is the axis of rotary shafts 7b) and the horizontal plane as seen in FIG. 5.

On the other hand, at the projected portion of the rotary shaft 7a having penetrated through the support plate 5a is provided rotation control means 14.

Figure 2:
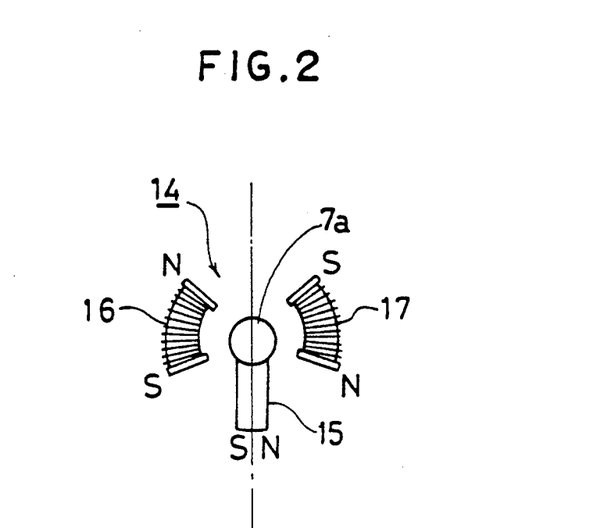
FIGS. 2 and 3 are schematic views of a control mechanism respectively showing different states thereof.

More particularly, as shown in FIG. 2, the rotation control means 14 is composed of a magnetic iron piece 15 projected radially outwards from the projected end portion of the rotary shaft 7a, and electromagnets 16 and 17 consisting of circular-arc-shape iron cores having magnetizing coils wound therearound and disposed integrally with the support plate 5a.

Both magnetizing coils of the electromagnets 16 and 17 form a single continuous coil, they have equal turns of winding and hence equal magnetomotive forces, the magnetic poles of the electromagnets 16 and 17 of the side opposed to the magnetic iron piece 15 have the same polarities as the magnetic poles on the opposed sides of the magnetic iron piece 15, and accordingly, repulsive forces are acted upon each other.

When the attitude sensing apparatus 1 is in a horizontal state, as shown in FIG. 2, the magnetic iron piece 15 is suspended vertically downwards from the rotary shaft 7a, and it is positioned at equal distances from the left and right electromagnets 16 and 17.

Figure 3:
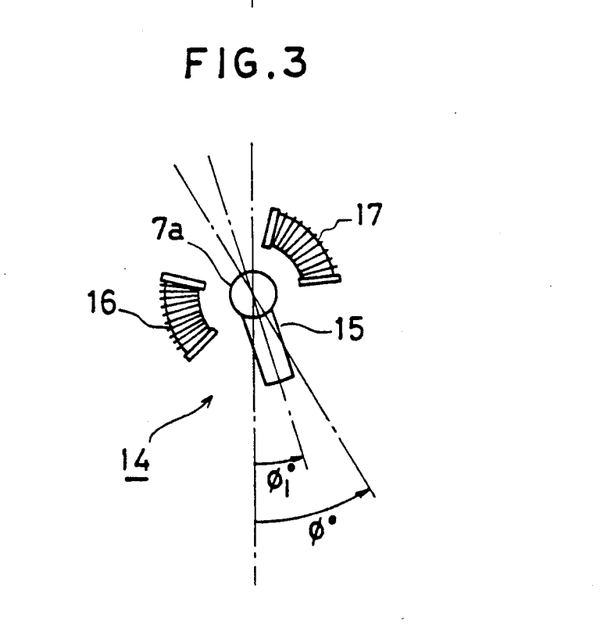

Assuming now that the attitude sensing apparatus 1 has tilted and the electromagnets 16 and 17 which are integral with the attitude sensing apparatus 1 have tilted to one side by an angle of Φ degrees as shown in FIG. 3, then the magnetic iron piece 15 will settle at the condition where a vertical downward force caused by the gravity and a repulsive force exerted principally by one electromagnet 16 on the approached side have balanced, and it will be rotated by an angle of $Φ_1$ degrees that is in the same direction, but smaller than the angle of Φ degrees by which the sensing apparatus has tilted.

Accordingly the sensor support 6a also is rotated with shafts 7a by the angle of $Φ_1$ degrees, and the disc 11 which forms a measuring plane likewise tilts with the shafts 7a of $Φ_1$ degrees relative to the (reference) horizontal plane shown in FIG. 5.

In applicant's above-discussed previous sensing apparatus a corresponding sensor support rotated by the angle of Φ degrees integrally with the attitude sensing apparatus and with the rotary shafts fixed to the sensor support while in the above-described example of the heretofore known apparatus displaying a tilt angle about only one axis, a sensor support was always directed vertically downwards without any tilt.

In the case of the attitude sensing apparatus of the illustrated embodiment, the rotational angle of $Φ_1$ degrees of the sensor support 6a can be appropriately adjusted by changing the current flowing through the electromagnets 16 and 17.

Accordingly, if the sensing apparatus has tilted in direction affecting both of the detecting devices 3a, 3b the optical reader 12a would read out a rotary angle of the disc 11, equal to the tilt angle α of the rotary shafts 7a relative to the horizontal plane, while the disc itself is tilted by the angle of $Φ_1$ degrees together with the rotary shafts 7a.

Even if the disc 11 should have a tilt, the disc 11 will rotate with shaft 9 so that the weight 13 may be positioned always at the lowermost end of the disc 11, and the optical reader 12a detects a tilt angle α of the rotary shafts 7a along the tilted measuring plane under the condition that the disc 11 is tilted by the angle of the $Φ_1$ degrees.

The other detecting device 3b having the same structure as the above-described detecting device 3a also can detect in a similar manner a tilt angle β of the rotary shafts 7b directed at right angles to the rotary shafts 7a along the tilted measuring plane.

On the basis of the above-described tilt angles α and β which are detected by respective optical readers 12a and 12b of both detecting devices 3a and 3b in the above-described manner, a maximum tilt angle θ can be calculated as θ' according to the following approximating formula:

$$\theta' = \sqrt{(\alpha^2 + \beta^2)} \qquad (1)$$

Figure 4:
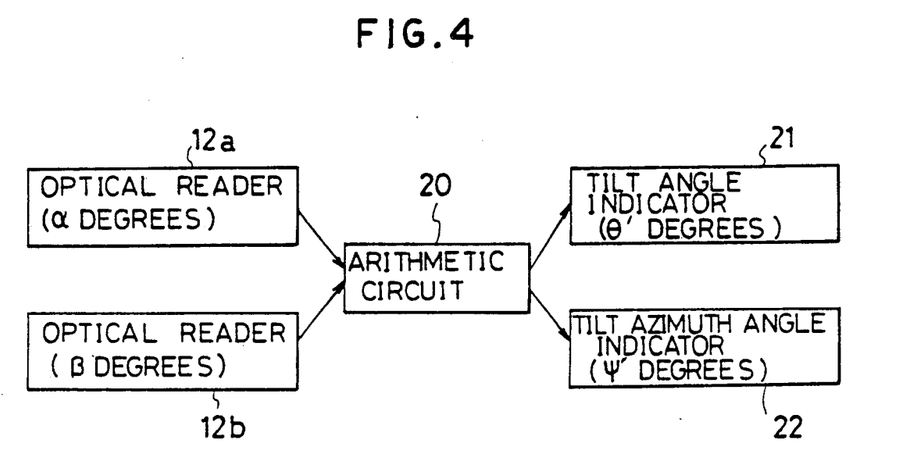
FIG. 4 is a schematic block diagram of a control system.

The calculation process is illustrated in a block form in FIG. 4, where the detected tilt angles $\alpha$ and $\beta$ issued from the above-mentioned optical readers 12a and 12b are input of an arithmetic circuit 20 composed of simple digital operation elements, operations based on appropriate calculating formulae such as the above-described formula (1); are executed in the arithmetic circuit 20, a calculated maximum tilt angle $\theta'$ is output to a tilt angle indicator 21 and is displayed there.

It is to be noted that although not shown in the drawings, output wiring from the optical readers 12a and 12b are led out through the inside of the rotary shafts 7a and 7b so as not to influence the rotation of the rotary shafts 7a and 7b, but it could be modified so as to be led out via slip rings.

In addition, the wiring extending from the optical readers 12a and 12b are led out from the casing 2 via a connector and connected to an operation/display unit provided separately from the attitude sensing apparatus 1, and in this operation/display unit are provided the arithmetic circuit 20, the tilt angle indicator 21.

Now, description will be made on the reasons why the maximum tilt angle can be calculated at an extremely high precision according to the aforementioned approximating formula (1) in the above-described structure not only in the case where the tilt angles $\alpha$ and $\beta$ are small but also even in the event that the structure has tilted largely.

Movement of a measuring plane corresponding to the disc 11 of one detecting device 3b is schematically illustrated in FIG. 5.

Here the angle formed between the axis of the rotary shafts 7b and the horizontal plane is represented by $\beta_1$ (degrees), the center of the measuring disc S (disc 11) is represented by O, a straight line parallel to the rotary shafts 7b and passing through the same center O is represented by X—X', and a straight line perpendicular to the straight line X—X' on the measuring disc S and passing through the center O is represented by Y—Y'.

If the sensor support 6b is free without being subjected to any control force, then the measuring disc S is always directed vertically, hence in FIG. 5 it becomes a true circle $S_1$ as shown by a single-dot chain line. Further, the position of the weight 13 is at the lowermost end $G_1$, and the reading by the optical reader 12b is $\angle G_1OY'$, that is, the tilt angle $\beta_1$ of the straight line X—X'.

Whereas, assuming that the sensor support 6b is fixed to the casing 2 and it swings integrally with the latter, then when the other detecting device 3a presents a tilt angle value $\alpha$ other than 0 degree, the measuring disc S will swing, and in FIG. 5 (the face of which represents a vertical plane) it becomes an ellipse $S_2$ as shown by a double-dot chain line.

Accordingly, the position of the weight is at the lowermost end $G_2$ of the ellipse, and the reading by the optical reader 12b indicates $\angle G_2OY'(=\beta_2)$.

However, in the illustrated embodiment, since the swing of the sensor support 6b is subjected to control by the electromagnets 16 and 17, under the above-mentioned condition the measuring disc S would swing to a certain extent, but not so much as the swing angle when the sensor support 6b is fixed to the casing 2.

Accordingly, in FIG. 5 the measuring disc S is represented by an ellipse in the middle between the true circle $S_1$ (single-dot chain line) and the ellipse $S_2$ (double-dot line), and the reading by the optical reader 12b would present an intermediate value between $\beta_1$ and $\beta_2$.

Figure 6:
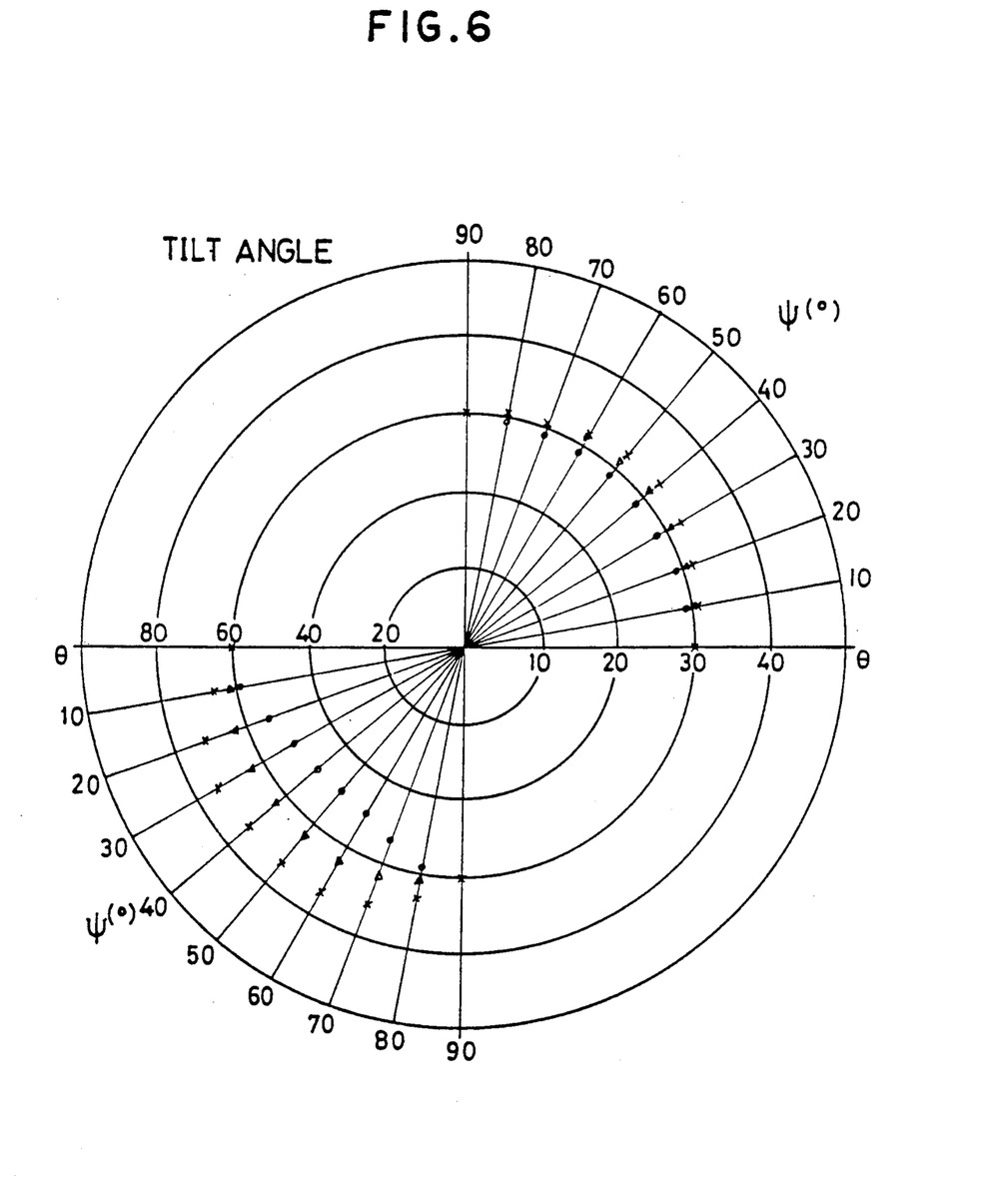
FIGS. 6 to 8 are diagrams showing results of experiments.

Now the experimental results are diagrammatically shown in FIG. 6.

In these experiments, when the azimuth angle $\psi$ was varied from 0 degree up to 90 degrees while fixing the maximum tilt angle $\theta$ at 30 degrees or at 60 degrees, the indicated values ($\theta'$) of the tilt angle indicator 21 which were obtained through the calculations according to the above-described approximating formula, were read out, and FIG. 6 represents these data graphically.

Marks O represent indicated values ($\theta'$) in the case where the sensor supports 6a and 6b are allowed to swing completely freely with respect to the casing 2, marks x represent indicated values in the case where the sensor supports 6a and 6b are fixed, and marks $\Delta$ represent the indicated values in the case where the control according to the above-described embodiment of the present invention is executed.

FIG. 6 is representation in a circular graph, in which for a given azimuth angle $\psi$, an indicated tilt angle $\theta'$ is represented as a radial distance.

Especially reviewing the data for $\theta=60°$ in which errors are revealed remarkably, in the case where the sensor support freely swings (marks O), the indicated tilt angles $\theta'$ present smaller values than 60 degrees, and especially in the proximity of $\psi=45°$ the error is large.

On the other hand, in the case where the sensor support is fixed (marks x), the displayed tilt angles $\theta'$ largely exceed 60 degrees.

In the case where control is executed for the sensor support in the attitude sensing apparatus according to the illustrated embodiment (marks $\Delta$), however, the indicated tilt angle $\theta'$ is slightly larger than $\theta=60°$, and even in comparison with the case where the sensor support freely swings (marks O) the errors are extremely small.

The above-mentioned tendency is also the same in the case of $\theta=30°$, and the errors are further reduced.

The arithmetic circuit 20 may calculate tilt azimuth angles $\psi'$ also, based on the detected tilt angles $\alpha$ and $\beta$ using a suitable approximating formula, and the calculated tilt azimuth angles $\psi'$ would be output to a tilt azimuth indicator 22 and displayed there.

Figure 7:
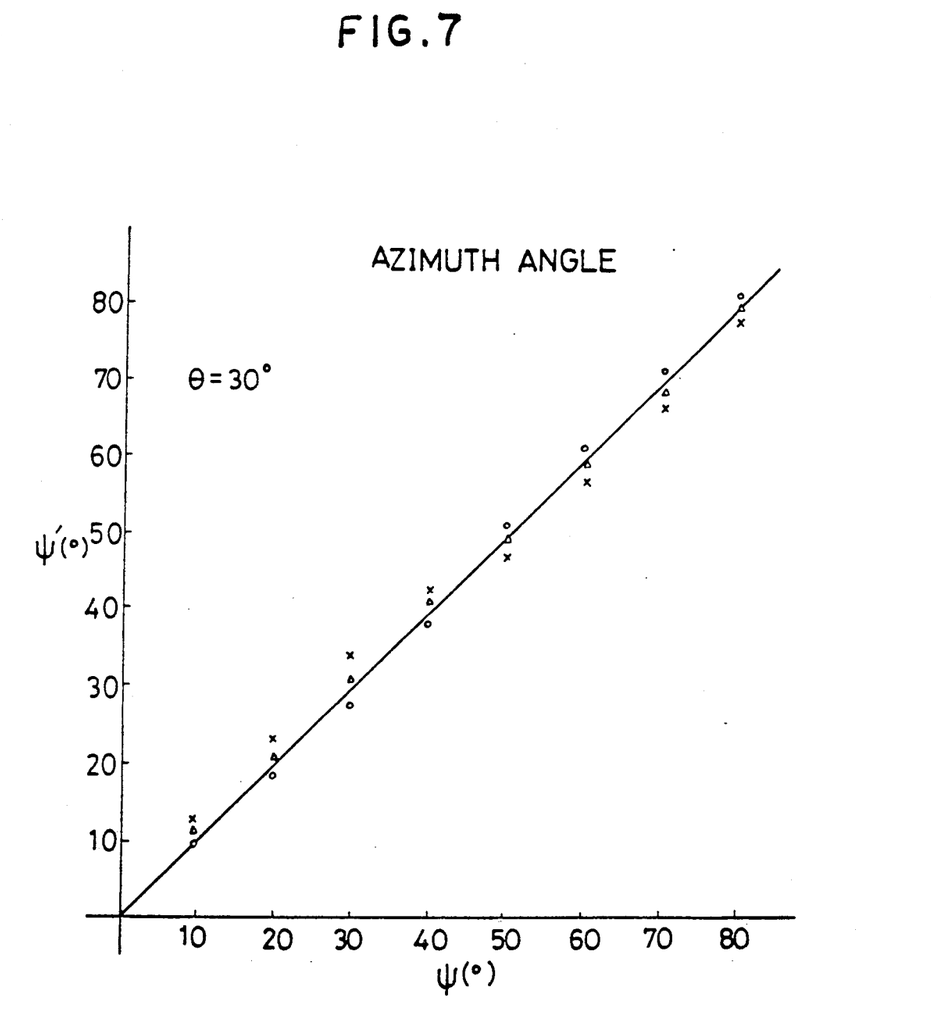
Figure 8:
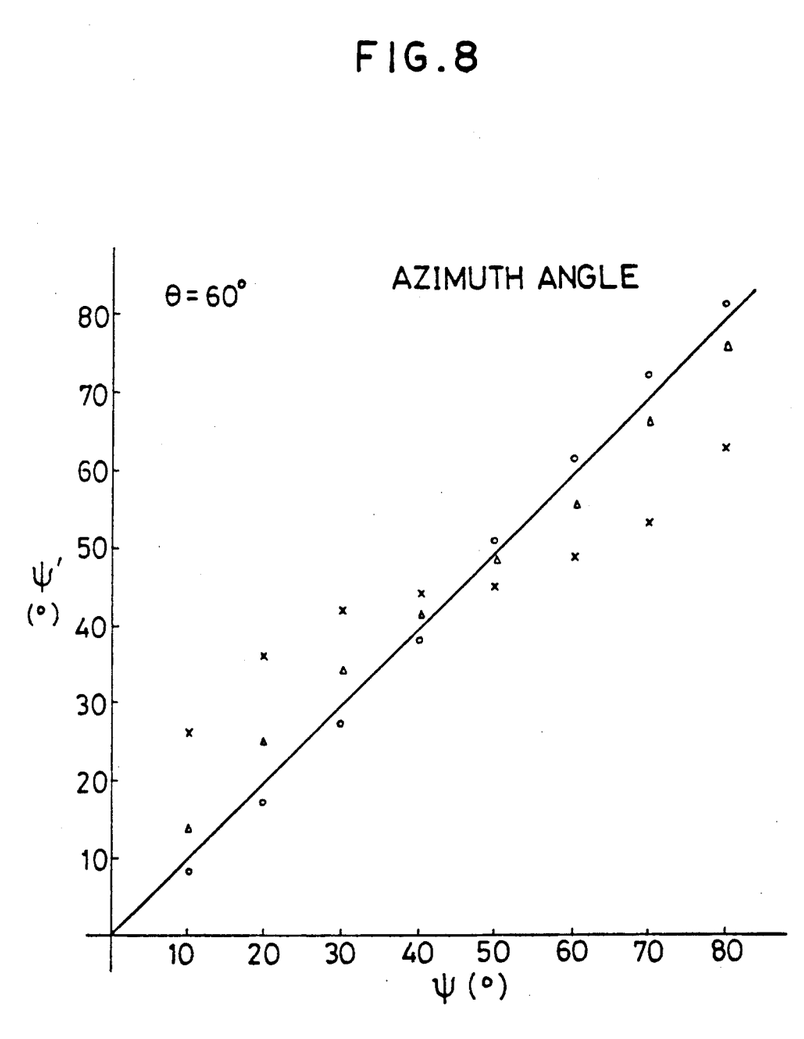

Next, reviewing the data of the indicated azimuth angle $\psi'$ obtained through experimentation and shown in FIGS. 7 and 8, in either case, the data distribute above or below the straight line representing $\psi'=\psi$ depending upon on which side of the boundary $\psi=45°$ the data exist.

The data in the case of the fixed sensor support (marks x) and the data in the case of the freely swinging sensor support (marks O) distribute on the opposite sides of the straight line representing $\psi'=\psi$ to each other for each value of $\psi$, and in the case of the controlled sensor support (marks $\Delta$) the data distribute in the middle of the data in the first-mentioned two cases. Further, the errors relating to the controlled sensor support (marks $\Delta$) are nearly of the same order as the case of the freely swinging sensor support (marks O).

From the above-described experimental data it is seen that in the case of the attitude sensing apparatus according to the above-described embodiment, with regard to an azimuth angle the errors are almost no different from those in the case of the freed sensor support, with regard to a tilt angle the errors are smaller than those in the case of the freed sensor support, and as a whole, the precision is significantly improved.

The above-mentioned result can be confirmed also through theoretical calculations.

It is to be noted that in practice the apparatus is preset so as to minimize the errors by adjusting the value of the current flowing through the electromagnets 16 and 17.

As described above, in the illustrated embodiment, owing to calculations based on approximating formulae, it is possible to calculate and indicate a precise maximum tilt angle and a precise tilt azimuth angle by means of a simple circuit construction.

Also, in addition to the fact that the calculation is simple, since swinging of the sensor support is controlled by electromagnets, the sensing apparatus is strongly resistant to being affected by vibration, its response is fast, and processing on a real-time basis is made possible.

Accordingly, a swinging angle of the sensor support is small, also an electric circuit is simple, and hence reduction in size and cost can be realized.

Furthermore, in order to quickly stabilize the rotation of the rotary shaft 7a, a magnetic damper mechanism could also be provided.

It is to be noted that while digital calculation was effected in the arithmetic circuit in the illustrated embodiment, it is alternatively possible to use analog calculation because the approximating formulae are quite simple. Thus, the apparatus can be improved into an apparatus having excellent, quick response characteristics. Also the tilt angle sensor is not limited to a digital value output type, but a tilt angle sensor of analog value output type is also available, and the data can be directly calculated in analog values themselves as discussed above.

As a practical system for calculating the tilt angle, an absolute encoder composed of a pendulum type sensor, a magnetic resistance element, a tilt meter of potentiometer type, servo type, bubble type, capacity type, mercury type, etc. can be utilized.

While the electromagnets 16 and 17 were used as braking means in the above-described embodiment, it is also possible to use permanent magnets having a predetermined magnetic force, or spring coils, spiral springs, sheet springs, spring wires or the like having a predetermined torque.

Figure 9:
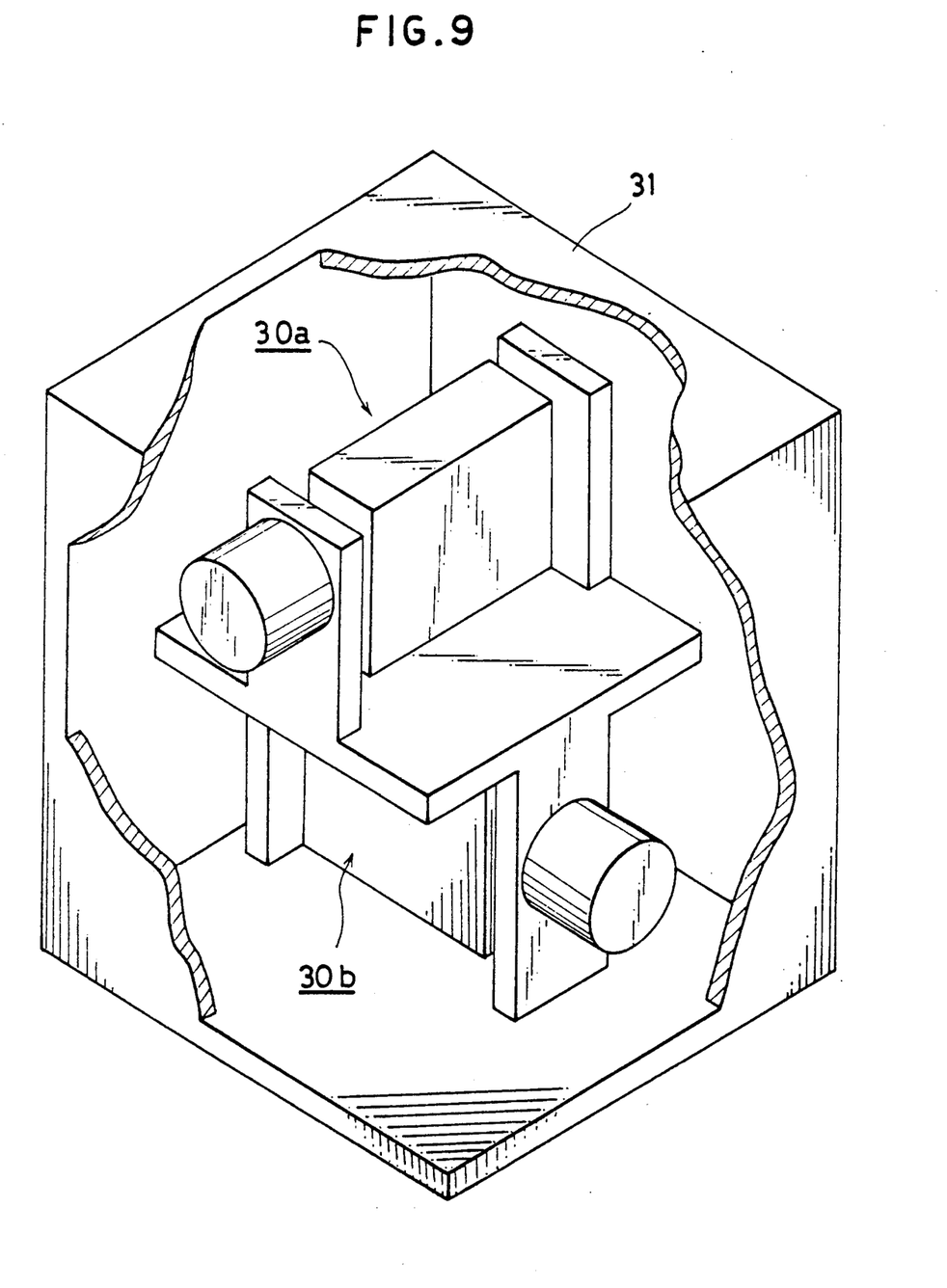
FIG. 9 is a perspective view partly cut away of an attitude sensing apparatus according to another preferred embodiment of the present invention.

Furthermore, while two detecting devices 3a and 3b were arranged two-dimensionally on the bottom plate within the casing 2 in the above-described embodiment, two detecting devices 30a and 30b could be arranged in a vertically superposed relationship as shown in FIG. 9. By employing such arrangement, a space within a casing 31 can be utilized effectively and further reduction in size of the apparatus can be realized.

As will be apparent from the detailed description of the preferred embodiments above, according to the present invention, since swinging of a sensor is controlled by control means, the apparatus can be quickly stabilized in a response speed is extremely fast, and so, indications having excellent, quick response characteristics and utilization of the data for controlling another apparatus on a real-time basis are possible.

Owing to the small swinging angle of the sensor support resulted from the control so as to suppress the swinging angle, reduction in sizes of the apparatus can be realized.

Moreover, since a precise maximum, tilt angle and its azimuth angle may be calculated by making use of predetermined approximating calculation, response characteristics can be further improved with a simple circuit construction. Also the improvement can contribute to realization of a small size and a light weight, and reduction in cost can be achieved.

Since many changes and modifications can be made in the above-described construction without departing from the spirit of the invention, all matter contained in the above description and illustrated in the accompanying drawings shall be interpreted to be illustrative and not in a limiting sense.

What is claimed is:

1. An attitude sensing apparatus comprising two detecting devices disposed on a structure to be measured at right angles to each other, each detecting device including a rotary shaft rotatably supported from said structure, a sensor support integrally held by said rotary shaft and biased vertically by gravity, said sensor support defining a predetermined measuring plane containing the axis of said rotary shaft, a tilt angle sensor supported by said sensor support for detecting a tilt angle of the axis of said rotary shaft with respect to a horizontal line on said measuring plane, and control means for controlling rotation of said rotary shaft with respect to said structure, said control means including means for rotating said rotary shaft when said structure rotates about said rotary shaft in the same rotational direction as said structure by a predetermined rotational angle smaller than the rotational angle of said structure; and calculator means for calculating the attitude of said structure on the basis of detected values fed from said tilt sensors of both said detecting devices.

2. An attitude sensing apparatus as claimed in claim 1, wherein said tilt angle sensor comprises a second rotary shaft supported from said sensor support so as to be rotatable about an axis directed in a perpendicular direction to said first rotary shaft, a disc fixed to said second rotary shaft, and a member fixed to said sensor support at a position opposite to said disc for sensing a rotary angle of said disc.

3. An attitude sensing apparatus as claimed in claim 2, wherein a weight is fixed to a predetermined portion of the outer circumference of said disc.

4. An attitude sensing apparatus as claimed in claim 2, wherein said member for sensing a rotary angle of said disc is an optical reader.

5. An attitude sensing apparatus as claimed in claim 1, wherein said control means comprises a magnetic iron piece projecting radially outwards from an end portion of said rotary shaft, and a pair of magnets opposed to each other on opposite sides of said magnetic iron piece in a spaced relationship thereto and fixed with respect to said structure.

6. An attitude sensing apparatus as claimed in claim 1, wherein said calculator means is adapted to calculate as maximum tilt angle $\theta$ on the basis of tilt angles $\alpha$ and $\beta$ detected by the tilt angle sensors in said two detecting devices, according to the following approximating formula:

$$\theta = \sqrt{(\alpha^2 + \beta^2)}$$

7. An attitude sensing apparatus as claimed in claim 1, wherein the rotary shafts of said two detecting devices are disposed within a single plane.

8. An attitude sensing apparatus as claimed in claim 1, wherein said two detecting devices are disposed in a vertically superposed relationship.

* * * * *

UNITED STATES PATENT AND TRADEMARK OFFICE
CERTIFICATE OF CORRECTION

PATENT NO. : 5,174,035
DATED : December 29, 1992
INVENTOR(S) : Shigemi Yamazaki

It is certified that error appears in the above-identified patent and that said Letters Patent is hereby corrected as shown below:

Column 5, line 28, after "angle" insert --$\theta$--.

Signed and Sealed this

Nineteenth Day of October, 1993

Attest:

BRUCE LEHMAN

*Attesting Officer*     *Commissioner of Patents and Trademarks*